United States Patent Office 2,813,109
Patented Nov. 12, 1957

2,813,109

11-OXYGENATED-12-HALO-17-ALKYL-17-HYDROXY-4-ANDROSTEN-3-ONES

Frank B. Colton, Chicago, and Edwin J. Strojny, Skokie, Ill., assignors to G. D. Searle & Co., Chicago, Ill., a corporation of Delaware No Drawing. Application June 4, 1956,
Serial No. 588,992

9 Claims. (Cl. 260—397.45)

The present invention relates to a new class of halogenated steroids, and is particularly concerned with 12-haloandrostene derivatives which can be represented by the structural formula

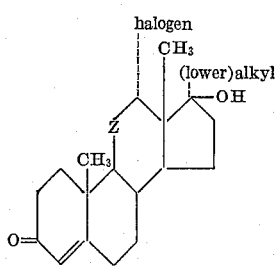

wherein Z can represent a carbinol (CHOH) group or a carbonyl (C=O) group. The compounds of this invention consequently include the 11,17-dihydroxy-12-halo-17-alkyl-4-androsten-3-ones of the general formula

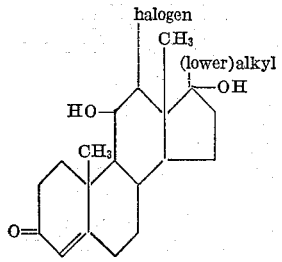

and the 12-halo-17-alkyl-17-hydroxy-4-androstene-3,11-diones of the general formula

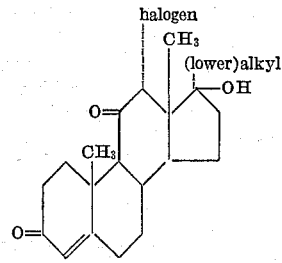

In the foregoing structural representations the term "lower alkyl" can represent straight and branched-chain alkyl radicals containing fewer than 9 carbon atoms, although preferred embodiments of the invention are those compounds in which the alkyl group thus designated is methyl or ethyl. In the preferred embodiments of this invention the halogen atom is fluorine, chlorine, or bromine.

One of the starting materials suitable for the manufacture of compositions of this invention is 17α-methyl-17β-hydroxy-4,11-androstadien-3 - one (11 - dehydro - 17-methyltestosterone) described in Helvetica Chimica Acta, 32, 1978 (1949). By treatment of this compound in dioxane solution with N-bromoacetamide and aqueous perchloric acid, there is obtained the bromohydrin, 11β,17β-dihydroxy-12α-bromo-17α-methyl - 4 - androsten - 3 - one. Upon treatment of this compound in ethanol solution with potassium acetate there is obtained the epoxide, 11,12-epoxy-17α-methyl-17β - hydroxy - 4 - androsten - 3-one, which affords other 11,12-halohydrin compositions of this invention upon treatment with hydrogen halides as described hereinafter.

Another compound which can be employed as a starting material in the manufacture of compositions of this invention is the enol ether, 3-ethoxy-3,5,11-androstatrien-17-one, described in the reference cited hereinabove. By treatment of an etheral solution of this compound with an alkylmagnesium halide such as ethylmagnesium bromide and subjecting the reaction mixture to acidic hydrolysis, there is obtained 17α-ethyl-17β-hydroxy-4,11-androstadien-3-one (11-dehydro-17-ethyltestosterone), which affords 11β,17β-dihydroxy-12α-bromo-17α-ethyl-4-androsten-3-one by treatment with N-bromoacetamide and aqueous perchloric acid in dioxane solution. The bromohydrin thus obtained is converted to the corresponding epoxide and then to other halohydrin compositions of this invention by treatment with potassium acetate in refluxing ethanol and then with other hydrogen halides.

The 12α-halo-17α-alkyl-17β-hydroxy-4-androstene-3,11-diones of this invention are obtained by subjecting the corresponding 11β,17β-dihydroxy-12α-halo-17α-alkyl 4-androsten-3-ones to oxidation by an oxidizing reagent comprising chromium trioxide in pyridine or chromium trioxide in acetic acid, followed by isolation of the resulting oxidized product.

The compositions of the present invention have useful pharmacological properties. They are exceptionally potent anabolic agents, and produce a beneficial effect in promoting the metabolic retention of nitrogen. They are also androgenic agents.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

Example 1

To a stirred mixture of 5 parts of 17α-methyl-17β-hydroxy-4,11-androstadien-3-one in 55 parts of dioxane there are added a 1.0 molar solution of perchloric acid containing a total of 0.45 part of perchloric acid and then 3.8 parts of N-bromoacetamide. The mixture is stirred for 15 minutes at about 25° C., after which 2% aqueous sodium sulfite solution is added to react with the excess of N-bromoacetamide. The mixture is diluted with water, and when separation of the insoluble product is complete, it is collected and washed. A solution of this product in ethyl acetate is washed with several small portions of water, dried and concentrated under reduced pressure. The non-volatile residue is crystallized from a mixture of acetone and petroleum ether, whereby there is obtained 11β,17β-dihydroxy-12α-bromo - 17α - methyl - 4-androsten-3-one. This compound shows infrared absorption maxima at about 2.9, 6.0 and 6.2 microns, and a specific rotation of about +48° in chloroform solution.

Example 2

A solution of 3 parts of 11β,17β-dihydroxy-12α-bromo-17α-methyl-4-androsten-3-one in 160 parts of ethanol is mixed with 12 parts of potassium acetate and heated under reflux in a nitrogen atmosphere for 2 hours. The cooled mixture is filtered, and the filtrate is diluted with water and chilled until separation of the insoluble product is complete. This product is collected and dissolved in ethyl acetate. The ethyl acetate solution is washed with several small portions of water and concentrated to dryness under reduced pressure. The non-volatile residue, which consists substantially of 11,12-epoxy-17α-methyl-17β-hydroxy-4-androsten-3-one, is dissolved in a solution prepared from 15 parts of acetic acid and 15 parts of propionic acid. This solution is chilled, treated with 60 parts of 52% aqueous hydrofluoric acid, and maintained at about −20° C. for 8 hours, after which it is partitioned between ethyl acetate and saturated sodium bicarbonate solution, with the employment of sufficient sodium bicarbonate solution to neutralize all of the acidic components of the original reaction mixture. The separated ethyl acetate solution is washed with one more portion of sodium bicarbonate solution and then with several small portions of water, after which it is dried and concentrated under reduced pressure. The non-volatile residue is crystallized from a mixture of acetone and petroleum ether, whereby there is obtained 11β,17β-dihydroxy - 12α-fluoro-17α-methyl-4-androsten-3-one which has an ultraviolet absorption maximum at 240 millimicrons with a molecular extinction coefficient of about 16,000. Infrared absorption maxima appear at about 2.9, 6.0 and 6.2 microns.

*Example 3*

A stirred solution of 2 parts of 3-ethoxy-3,5,11-androstatrien-17-one in 30 parts of anhydrous ether is treated by the gradual addition of an ethereal solution of 20 parts of ethylmagnesium bromide. The reaction mixture is maintained under reflux for 2 hours by application of external heat as necessary, and it is then poured into ice water and made distinctly acidic by the addition of hydrochloric acid. Sufficient methanol is added to produce a single phase solution, and this acidified solution is stirred at about 20–25° C. for 4 hours, after which it is concentrated under reduced pressure until most of the methanol and ether are removed. Excessive heating is avoided. The aqueous suspension which remains is extracted repeatedly with ether, and the combined ethereal extracts are washed with several portions of water, dried, and concentrated under reduced pressure. When the residue obtained by vaporization of the ether is crystallized from a mixture of acetone and petroleum ether, there is obtained 17α-ethyl-17β-hydroxy-4,11-androstadien-3-one (11-dehydro-17-ethyltestosterone). This compound has an ultraviolet absorption maximum at 241 millimicrons with a molecular extinction coefficient of about 17,000.

*Example 4*

A stirred mixture of 20 parts of 17α-ethyl-17β-hydroxy-4,11-androstadien-3-one in 300 parts of dioxane, maintained at about 25° C., is treated by the addition of a 1.0 molar solution of perchloric acid containing a total of 2 parts of perchloric acid and then with 15 parts of N-bromoacetamide. Stirring is continued for 20 minutes, after which dilute sodium sulfite solution is added to react with the excess of N-bromoacetamide. The insoluble product obtained by dilution of the mixture with water is collected, washed, and dissolved in ethyl acetate. The ethyl acetate solution is washed with several small portions of water, dried and concentrated under reduced pressure. The non-volatile residue consists substantially of crude 11β,17β-dihydroxy-12α-bromo-17α-ethyl-4-androsten-3-one, which has a specific rotation of about +45° in chloroform solution. It is dissolved in 1500 parts of ethanol. Potassium acetate (120 parts) is added, and the mixture is heated under reflux in a nitrogen atmosphere for 2 hours, after which it is diluted with water and chilled until separation of the insoluble product is complete. This product is collected and dissolved in ethyl acetate. The ethyl acetate solution is washed with several small portions of water and concentrated to dryness under reduced pressure. The non-volatile residue is crude 11,12-epoxy-17α-ethyl-17β-hydroxy-4-androsten-3-one, which is suitable for use in subsequent operations without further purification. This compound has the structural formula

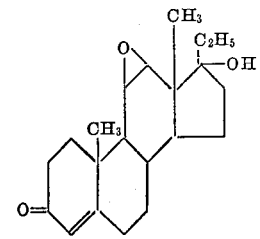

*Example 5*

A rapid stream of anhydrous hydrogen chloride is passed through a solution of 7 parts of 11,12-epoxy-17α-ethyl-17β-hydroxy-4-androsten-3-one in 600 parts of chloroform, maintained at about 0° C. The introduction of hydrogen chloride is continued for 2–5 minutes at such a rate that at least 20 parts of this gas is introduced. The cold solution is immediately washed with saturated sodium bicarbonate solution and then with several portions of water, after which it is concentrated to dryness under reduced pressure. By recrystallization of the non-volatile residue from a mixture of ethyl acetate and petroleum ether there is obtained 11β,17β-dihydroxy-12α-chloro-17α-ethyl-4-androsten-3-one which has infrared absorption maxima at 2.9, 6.0 and 6.2 microns, and an ultraviolet absorption maximum at 241 millimicrons with a molecular extinction coefficient of about 16,000.

*Example 6*

By the procedure of Example 5, with the substitution of 7 parts of 11,12-epoxy-17α-methyl-17β-hydroxy-4-androsten-3-one for the 11,12-epoxy-17α-ethyl-17β-hydroxy-4-androsten-3-one, there is obtained 11β,17β-dihydroxy-12α-chloro-17α-methyl-4-androsten-3-one.

*Example 7*

A chilled solution of 2 parts of 11,12-epoxy-17α-ethyl-17β-hydroxy-4-androsten-3-one, 12 parts of acetic acid and 12 parts of propionic acid is treated with 50 parts of 52% aqueous hydrofluoric acid and maintained at about −20° C. for 8 hours. It is then partitioned between ethyl acetate and saturated sodium bicarbonate solution, with the employment of sufficient sodium bicarbonate solution to neutralize all of the acidic components of the original reaction mixture. The separated ethyl acetate solution is washed with sodium bicarbonate solution and then with several small portions of water, after which it is dried and concentrated under reduced pressure. By crystallization of the non-volatile residue from a mixture of acetone and petroleum ether there is obtained 11β,17β-dihydroxy - 12α - fluoro - 17α - ethyl - 4 - androsten-3-one which shows infrared absorption maxima at 2.9, 6.0 and 6.2 microns.

*Example 8*

An oxidizing medium prepared by adding a total of 10 parts of chromium trioxide in small portions to 200 parts of pyridine maintained at about 25°–30° C. is mixed with a solution of 10 parts of 11β,17β-dihydroxy-12α-bromo - 17α - methyl - 4 - androsten - 3 - one in 300 parts of pyridine, and the resulting reaction mixture is allowed to stand, with intermittent agitation, for about 15 hours. The mixture is then diluted to several times its volume with water and extracted with ethyl acetate. Separation into phases is facilitated by removing by filtration solid material insoluble in either phase. The ethyl acetate solution is washed with dilute hydrochloric acid, with several portions of water, and is concentrated to dryness under reduced pressure. By crystallization of the residue from a mixture of ethyl acetate and petroleum ether there is obtained 12α - bromo - 17α - methyl - 17β - hydroxy-4-androstene-3,11-dione, which shows infrared absorption maxima at 2.9, 5.8, 6.0 and 6.2 microns. An ultraviolet absorption maximum appears at 238 millimicrons with a molecular extinction coefficient of about 16,500.

Example 9

By the procedure of Example 8, with the substitution of 11β,17β - dihydroxy - 12α - bromo - 17α - ethyl-4-androsten-3-one for the 11β,17β - dihydroxy-12α-bromo-17α - methyl - 4 - androsten - 3 - one, there is obtained 12α - bromo - 17α - ethyl - 17β - hydroxy - 4 - androstene-3,11 - dione.

Example 10

A solution of 2 parts of 11β,17β-dihydroxy-12α-fluoro-17α-methyl-4-androsten-3-one in 160 parts of acetic acid, maintained at about 15° C. by means of an external cooling bath, is treated by the gradual addition, with stirring, of a solution of 2 parts of chromium trioxide, 4 parts of water, and 15 parts of acetic acid. The mixture is maintained at about 15–20° C. for 2 hours, after which it is stirred with a solution of 6 parts of sodium sulfite in 100 parts of water and then concentrated almost to dryness by evaporation, which can be accelerated by employment of a stream of nitrogen. The wet, solid residue is stirred with 100 parts of water until no more will dissolve, and the insoluble reaction product is collected on a filter, washed with water, and crystallized from a mixture of ethyl acetate and petroleum ether to afford 12α-fluoro - 17α - methyl - 17β - hydroxy - 4 - androstene-3,11-dione which exhibits infrared absorption maxima at 2.9, 5.8, 6.0 and 6.2 microns. This compound has an ultraviolet absorption maximum at 238 millimicrons with a molecular extinction coefficient of about 16,000.

Example 11

By the procedure of Example 10, with the substitution of 11β,17β - dihydroxy - 12α - fluoro - 17α - ethyl-4-androsten-3-one for the 11β,17β-dihydroxy-12α-fluoro-17α-methyl-4-androsten - 3 - one, there is obtained 12α-fluoro-17α-ethyl-17β-hydroxy-4-androstene-3,11-dione.

Example 12

An oxidizing reagent is prepared by the addition in several portions of a total of 5 parts of chromium trioxide to 100 parts of pyridine, stirred and maintained at about 25–30° C. To this reagent there is added a solution of 5 parts of 11β,17β - dihydroxy - 12α - chloro -17α - ethyl-4-androsten-3-one in 150 parts of pyridine, and the reaction mixture is allowed to stand for about 18 hours, after which it is diluted with several times its volume of water and extracted with ethyl acetate. The filtered ethyl acetate extract is washed with dilute hydrochloric acid and with several portions of water, and is then concentrated to dryness under reduced pressure. By crystallization of the residue from a mixture of ethyl acetate and petroleum ether there is obtained 12α-chloro-17α-ethyl-17β - hydroxy - 4 - androstene - 3,11 - dione which has infrared absorption maxima at 2.9, 5.8, 6.0 and 6.2 microns, and an ultraviolet absorption maximum at 238 millimicrons with a molecular extinction coefficient of about 16,000.

Example 13

By the procedure of Example 12, with the substitution of 11β,17β - dihydroxy - 12α - chloro - 17α - methyl-4-androsten-3-one for the 11β,17β-dihydroxy - 12α - chloro-17α - ethyl - 4 - androsten - 3 - one, there is obtained 12α-chloro - 17α - methyl - 17β - hydroxy - 4 - androstene-3,11 - dione.

What is claimed is:
1. A compound of the structural formula

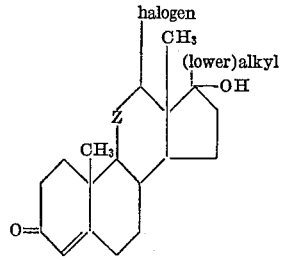

wherein Z is a member of the class consisting of carbinol and carbonyl groups.

2. 11β,17β - Dihydroxy - 12α - fluoro - 17α - (lower)alkyl-4-androsten-3-one.

3. 11β,17β - Dihydroxy - 12α - fluoro - 17α - methyl-4-androsten-3-one.

4. 11β,17β - Dihydroxy - 12α - chloro - 17α - (lower)alkyl-4-androsten-3-one.

5. 11β,17β - Dihydroxy - 12α - chloro - 17α - methyl-4-androsten-3-one.

6. 12α - Fluoro - 17α - (lower)alkyl - 17β - hydroxy-4-androstene-3,11-dione.

7. 12α - Fluoro - 17α - methyl - 17β - hydroxy-4-androstene-3,11-dione.

8. 12α - Chloro - 17α - (lower)alkyl - 17β - hydroxy-4-androstene-3,11-dione.

9. 12α - Chloro - 17α - methyl - 17β - hydroxy-4-androstene-3,11-dione.

References Cited in the file of this patent
UNITED STATES PATENTS

| 2,602,804 | Kendall | July 8, 1952 |
| 2,660,586 | Murray | Nov. 24, 1953 |
| 2,678,933 | Meister | May 18, 1954 |
| 2,695,907 | Murray | Nov. 30, 1954 |
| 2,697,110 | Murray | Dec. 14, 1954 |
| 2,702,811 | Colton | Feb. 22, 1955 |
| 2,735,854 | Herr | Feb. 21, 1956 |